C. B. WOODWORTH.
ANTISLIPPING AND ANTISKIDDING ATTACHMENT FOR TIRES.
APPLICATION FILED DEC. 21, 1910.
1,009,368.  Patented Nov. 21, 1911.
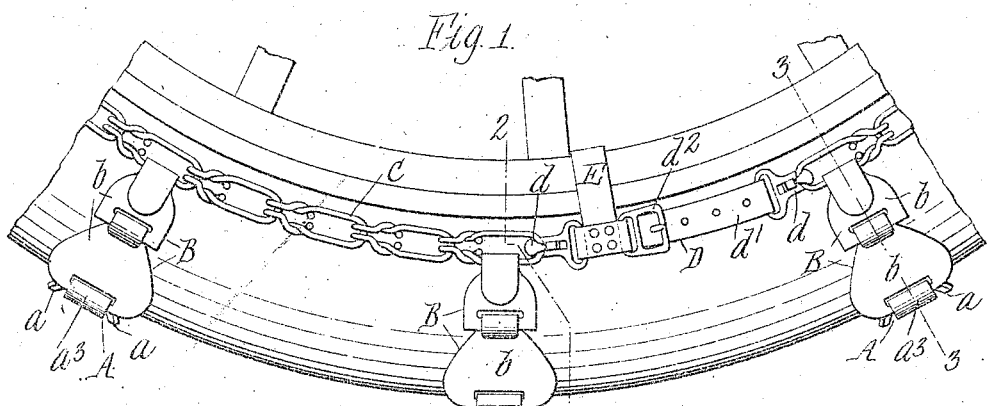
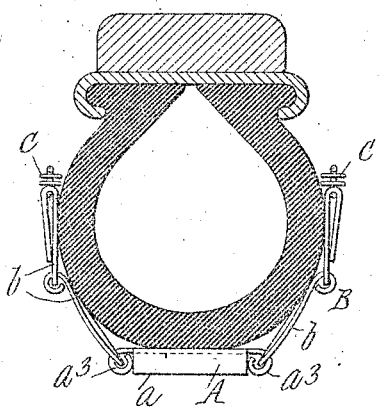
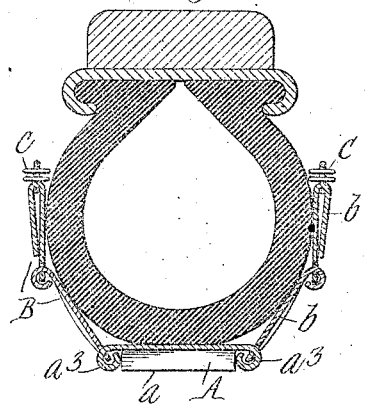
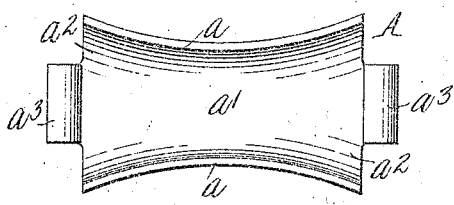
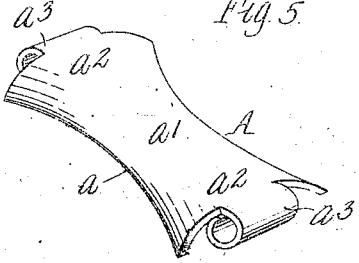
Witnesses
A. G. Dimond
C. H. Bund
Inventor
Charles B. Woodworth,
By Wilhelm, Parker & Hand
Attorneys.

UNITED STATES PATENT OFFICE.

CHARLES B. WOODWORTH, OF NIAGARA FALLS, NEW YORK.

ANTISLIPPING AND ANTISKIDDING ATTACHMENT FOR TIRES.

1,009,368.   Specification of Letters Patent.   Patented Nov. 21, 1911.

Application filed December 21, 1910. Serial No. 598,486.

*To all whom it may concern:*

Be it known that I, CHARLES B. WOODWORTH, a subject of the King of Great Britain, residing at Niagara Falls, in the county of Niagara and State of New York, have invented a new and useful Improvement in Antislipping and Antiskidding Attachments for Tires, of which the following is a specification.

This invention relates to anti-slipping and anti-skidding attachments for tires which are constructed so that they can be attached to and detached from the tires of vehicle wheels, and are designed to increase the grip or traction of the tires on the road to prevent them from slipping or skidding thereon.

The object of this invention is to provide an anti-slipping and anti-skidding attachment of this kind which is simple and inexpensive in construction, which will insure a secure and firm grip of the tire on the road and which will not shift its position on the tire nor cut into or unduly wear upon the face thereof.

In the accompanying drawings: Figure 1 is a fragmentary side elevation of a vehicle wheel and tire provided with an attachment embodying the invention. Fig. 2 is a sectional elevation thereof, on an enlarged scale, in line 2—2, Fig. 1. Fig. 3 is a similar section in line 3—3, Fig. 1. Fig. 4 is an enlarged bottom plan view of one of the tread plates. Fig. 5 is a perspective view thereof.

Like reference characters refer to like parts in the several figures.

The attachment is intended especially for use upon pneumatic tires of the usual type, such as the one shown in the drawings, but it can be adapted for use, if desired, upon other and different styles and kinds of tires. It comprises a plurality of tread plates A which are arranged at intervals about the circumferential tread portion of the tire, extending transversely thereof, and which are connected at their ends by suitable link connections B to securing chains C which surround the tire on opposite sides thereof adjacent to the rim of the wheel and have their ends detachably connected together for detachably securing the attachment to the tire.

The tread-plates A are concavo-convex in cross section, transversely of the tire, and are arranged on the tire with their convex portions bearing against the tire and their concave portions opening outwardly or away from the face of the tire. Each plate has opposite side edges $a$ which lie in the same plane and are each an equal distance from the longitudinal axis of the tread plate so that these edges present a flat edge surface throughout their length to the road, and when both are in engagement with the surface of the road the tread plate rests squarely thereon. This insures a firm and uniform grip of the tread plate throughout its length on the road and affords an extended bearing and wearing surface to the plate.

The edges $a$ are bowed or curved longitudinally of the plate so that they approach each other in the middle or central portion of the plate and curve outwardly away from each other toward their opposite ends. The plate thus has a narrow or contracted middle or central portion $a'$ and wider or expanded end portions $a^2$. The curved form of the side edges affords a more extended bearing surface to the plate for opposing endwise movement thereof than if the side edges of the plate were straight longitudinally thereof. While this construction is preferred, the side edges may be be curved or bent in any other suitable manner or form so as to prevent longitudinal or endwise movement of the plates on the surface upon which they bear and hold the tire from slipping or skidding laterally on the road.

The connections B B which secure the ends of the tread plates to the chains C C may be of any suitable construction and may be connected to the plates and chains in any desirable manner. In the construction shown, the tread plates are preferably provided at their opposite ends with transversely extending loops or eyes $a^3$ which are formed integrally with the plates by bending over end extensions thereof, and are so constructed that their outer edge will lie approximately in the same plane with the side edges $a$ $a$ of the plates so as to engage the surface of the road and assist in preventing endwise movement of the plates thereon. The connections B B comprise flat links $b$ $b$ which are hinged together and one of which engages in the loop $a^3$ of the tread plate while the other has hooked engagement with the chain C. These links are arranged with their flat faces on the inner side of the attachment so that when the latter is in position on the tire, the flat faces of the links will engage the outer surface of the tire. The attachment thus presents a smooth surface to the tread and side portions of the tire and has no sharp edges or projecting portions on its inner side which would tend to cut the tire or cause undue wear upon any part thereof.

The chains C C are of any suitable construction and preferably have their ends connected together for detachably securing them to the tire, by a strap take-up D having snap hooks $d$ $d$ in its opposite ends for engagement with links in the ends of the chain. The hooks $d$ $d$ are connected by a strap $d'$ and buckle $d^2$ which enable any slack in the chains to be taken up so that the attachment can be fitted snugly on the tire.

As the attachment presents to the tire a smooth interior surface throughout its length, it is necessary to provide means for preventing relative endwise movement between the attachment and the tire, as otherwise the attachment would afford no grip for the tire on the road. This may be done in any suitable manner and the attachment may be secured to the rim, the spokes or any other fixed part of the wheel. In the construction shown, a very simple device is employed for this purpose. The take-up straps D D on opposite sides of the tire are connected by a strap E which extends over the inner side of the wheel rim between two adjacent spokes. When the attachment encounters any resistance which tends to hold it from turning with the tire, the tire will turn in the attachment and the position of the attachment will be advanced on the tire until the strap E is brought into engagement with one of the spokes between which it extends. This will stop further relative movement between the parts in that direction. In case of movement between the parts in an opposite direction, the attachment will shift its position on the tire and the strap E will be brought into engagement with the other spoke and will then prevent further relative movement between the attachment and the tire in that direction. The strap E thus forms a very simple and inexpensive means for effectually preventing any endwise movement of the attachment and tire independently of each other other than the initial movement above described. This initial movement between the parts is so slight as to be scarcely noticeable and does not interfere with the effective operation of the attachment. If desired, however, the strap E may be connected directly with one of the spokes, in which case there will be no initial movement between the parts, or the chain may be connected directly to one or more of the spokes or to some other fixed part on the wheel.

The narrow or contracted central portion of the tread plate, by reason of its shape, is of considerably greater strength and rigidity than the wider end portions of the plate and the plates are adapted to be arranged on the tire so that they will present their contracted central portions to the central tread portion of the tire, which carries the greater part of the weight of the vehicle, while their end portions will engage the outer tread portions of the tire away from the center where the weight carried is not as great. The plates are thus able to withstand the severe pressure and strain to which they are subjected without flattening or spreading thereunder, and at the same time, by reason of their wider ends, they obtain a firmer and more secure grip upon the surface of the road than if they were of the same width throughout. In traveling over the road, the plates being narrow in that portion where they are subjected to the greatest weight and pressure, will readily sink into the tire so that the tire will roll over the plates without producing any perceptible jar to the vehicle.

The connections for the plates permit them to roll somewhat on the surface of the tire so that as the tire advances and one edge of a tread plate comes in contact with the surface of the road, the pressure thereon causes the plate to roll slightly on the tire so as to bring the other edge of the plate in contact with the road, and in the same manner, when the tire leaves the road, the plate will roll so that both edges will remain in contact with the surface of the road until lifted therefrom by the movement of the tire. This increases the grip of the plates on the road, prolongs somewhat the length of contact of the plates on the road and tends to prevent the shifting of the plates on the tire as they come in contact with and leave the surface of the road. The wear of the plates upon the tire is thus decreased and the plates present no sharp edges or angles to the surface of the tire which would tend to cut the same.

While the tread plates shown are concavo-convex in cross section, the invention is not limited to this construction but is intended to cover any tread plate of this general form in cross section, having a substantially straight central portion which extends longitudinally thereof and is adapted to bear against the tire, and side portions which project outwardly therefrom away from the tire and have bearing edges which lie in substantially the same plane and have portions thereof which extend at an angle to the longitudinal axis of the plate so as to resist endwise movement of the plate when in engagement with the surface of the road.

The tread plates can be formed by stamping them from sheet metal and the entire attachment is simple in construction, can be economically manufactured and can be quickly and easily secured to and detached from the tire.

I claim as my invention:

1. In an anti-slipping and anti-skidding attachment for tires, a tread plate which is substantially concavo-convex in cross section and has curved side edges located substantially in the same plane whereby they are adapted to bear throughout their length on a flat surface, said plate being adapted to be secured on the tire with its concave face against the tire and its side edges extending transversely of the tire, substantially as set forth.

2. In an anti-slipping and anti-skidding attachment for tires, a tread plate of substantially concavo-convex cross section which is of greater width at its ends than at its middle portion and has inwardly bowed side edges located substantially in the same plane whereby they are adapted to bear throughout their length on a flat surface, said plate being adapted to be secured on the tire with its convex face against the tire and its side edges extending transversely of the tire, substantially as set forth.

3. In an anti-slipping and anti-skidding attachment for tires, a tread plate of concavo-convex cross section which is of greater width at its ends than at its middle portion and has inwardly bowed side edges located substantially in the same plane whereby they are adapted to bear throughout their length on a flat surface, the convex face of said plate having a substantially straight central portion which extends longitudinally thereof, and said plate being adapted to be secured on the tire with its convex face against the tire and its side edges extending transversely of the tire, substantially as set forth.

4. In an anti-slipping and anti-skidding attachment for tires, a tread plate having a straight longitudinal central portion and side portions projecting outwardly therefrom, the edges of which lie in substantially the same plane whereby they are adapted to bear throughout their length on a flat surface, each edge having portions thereof which extend at an angle to the longitudinal axis of the plate, said plate being adapted to be secured on the tire with its straight portions in engagement therewith and its side portions projecting outwardly from the tire and extending transversely thereof, substantially as set forth.

5. In an anti-slipping and anti-skidding attachment for tires, a tread plate which is substantially concavo-convex in cross-section and has its side edges located substantially in the same plane whereby they are adapted to bear throughout their length on a flat surface, each edge having portions thereof which extend at an angle to the longitudinal axis of the plate to oppose endwise movement thereof, said plate being adapted to be secured on the tire with its convex face against the tire and its side edges extending transversely of the tire, substantially as set forth.

6. In an anti-slipping and anti-skidding attachment for tires, a tread plate which is substantially concavo-convex in cross-section and has its side edges located substantially in the same plane whereby they are adapted to bear throughout their length on a flat surface, the convex face of said plate having a substantially straight middle portion which extends longitudinally thereof, and means for securing said plate on the tire with its convex face against the tire and its side edges extending transversely of the tire, the connections between the ends of said plate and said securing means being arranged on the concave side of said plate without the plane of the straight middle portion thereof, substantially as set forth.

7. In an anti-slipping and anti-skidding attachment for tires, a tread plate which is substantially concavo-convex in cross-section and has its side edges located substantially in the same plane whereby they are adapted to bear throughout their length on a flat surface, the convex face of said plate having a substantially straight middle portion which extends longitudinally thereof, and means for securing said plate on the tire with its convex face against the tire and its side edges extending transversely of the tire, the connections between the ends of said plate and said securing means being arranged on the concave side of said plate without the plane of the straight middle portion thereof and extending transversely of the plate with their outer edges lying in substantially the same plane with the side edges of said plate, substantially as set forth.

8. In an anti-slipping and anti-skidding attachment for tires, a tread plate which is substantially concavo-convex in cross-section and has its side edges located substantially in the same plane whereby they are adapted to bear throughout their length on a flat surface, said plate having inturned fastening loops at its opposite ends which extend transversely thereof on its concave side and have their outer edges lying in substantially the same plane with the side edges of said plate, said plate being adapted to be secured on the tire with its convex face against the tire and its side edges extending transversely of the tire, substantially as set forth.

9. In an anti-slipping and anti-skidding attachment for tires, the combination of a tread plate of concavo-convex cross-section which is of greater width at its ends than at its middle portion and has inwardly bowed side edges located substantially in the same plane whereby they are adapted to bear throughout their length on a flat surface, the convex face of said plate having a substantially straight central portion which extends longitudinally thereof and has end extensions which are turned in to form fastening loops which extend transversely of the plate on the concave side thereof, and means engaging said fastening loops for securing said plate on the tire with its convex face against the tire and its side edges extending transversely of the tire, substantially as set forth.

Witness my hand, this 13th day of December, 1910.

CHARLES B. WOODWORTH.

Witnesses:
EDWARD C. HARD,
A. L. McGEE.